US010852747B2

(12) United States Patent
Huynh

(10) Patent No.: US 10,852,747 B2
(45) Date of Patent: Dec. 1, 2020

(54) TAILSTRIKE AWARENESS SYSTEM

(71) Applicant: The Boeing Company, Chicago, IL (US)

(72) Inventor: Neal Van Huynh, Bellevue, WA (US)

(73) Assignee: The Boeing Company, Chicago, IL (US)

(*) Notice: Subject to any disclaimer, the term of this patent is extended or adjusted under 35 U.S.C. 154(b) by 359 days.

(21) Appl. No.: 15/901,725

(22) Filed: Feb. 21, 2018

(65) Prior Publication Data
US 2019/0258272 A1  Aug. 22, 2019

(51) Int. Cl.
| | | |
|---|---|---|
| G05D 1/08 | (2006.01) | |
| B64C 13/04 | (2006.01) | |
| B64D 45/04 | (2006.01) | |
| B64D 45/00 | (2006.01) | |
| B64D 43/00 | (2006.01) | |
| B64C 13/10 | (2006.01) | |

(52) U.S. Cl.
CPC ........... *G05D 1/0808* (2013.01); *B64C 13/04* (2013.01); *B64C 13/10* (2013.01); *B64D 43/00* (2013.01); *B64D 45/00* (2013.01); *B64D 45/04* (2013.01)

(58) Field of Classification Search
CPC ........ B64D 45/04; B64D 45/00; B64D 45/06; B64D 13/04; B64D 47/02; B64D 2045/0085; B64D 43/00; G05C 2009/04766; B64C 13/10; B64C 13/341; G05G 5/03
See application file for complete search history.

(56) References Cited

U.S. PATENT DOCUMENTS

| | | | | |
|---|---|---|---|---|
| 5,527,002 A * | 6/1996 | Bilange | ................ | G05D 1/0661 244/181 |
| 5,735,490 A * | 4/1998 | Berthet | ................ | G05D 1/0061 244/223 |
| 5,901,927 A * | 5/1999 | Ho | ........................ | G05D 1/0676 244/183 |
| 6,422,517 B1 * | 7/2002 | DeWitt | ................ | G05D 1/0653 244/181 |

(Continued)

FOREIGN PATENT DOCUMENTS

| | | |
|---|---|---|
| EP | 2821341 | 1/2015 |
| WO | WO 2015/069228 | 5/2015 |

*Primary Examiner* — Christopher D Hutchens
(74) *Attorney, Agent, or Firm* — Haynes and Boone, LLP

(57) ABSTRACT

Systems, methods, and apparatus for reducing the probability of the occurrence of an aircraft's tailstrike are disclosed. In one or more embodiments, a disclosed method for reducing a probability of an occurrence of a tailstrike for an aircraft comprises determining whether a tailstrike has a first probability of occurring by using tailstrike related data. The method further comprises producing a tactile warning to a pilot of the aircraft, when at least one processor determines that a tailstrike has the first probability of occurring. In at least one embodiment, the determining of whether a tailstrike has a first probability of occurring comprises determining whether an aircraft pitch attitude is greater than a first probability threshold by using the tailstrike related data; and determining that a tailstrike has the first probability of occurring, when the aircraft pitch attitude is greater than the first probability threshold.

20 Claims, 16 Drawing Sheets

(56) References Cited

U.S. PATENT DOCUMENTS

| | | | |
|---|---|---|---|
| 6,583,733 B2* | 6/2003 | Ishihara | B64D 45/04 |
| | | | 340/946 |
| 6,737,987 B2* | 5/2004 | Conner | B64C 27/82 |
| | | | 244/17.11 |
| 6,761,336 B2 | 7/2004 | DeWitt et al. | |
| 8,532,848 B2 | 9/2013 | Ishihara et al. | |
| 2002/0030607 A1* | 3/2002 | Conner | B64C 27/82 |
| | | | 340/945 |
| 2003/0016145 A1* | 1/2003 | Bateman | B64D 43/02 |
| | | | 340/967 |
| 2015/0123821 A1* | 5/2015 | Greene | B64D 45/04 |
| | | | 340/967 |
| 2015/0344128 A1* | 12/2015 | Sandri | B64C 13/18 |
| | | | 244/223 |
| 2017/0015434 A1* | 1/2017 | McKay | G05D 1/0055 |
| 2017/0305573 A1 | 10/2017 | Greene et al. | |

* cited by examiner

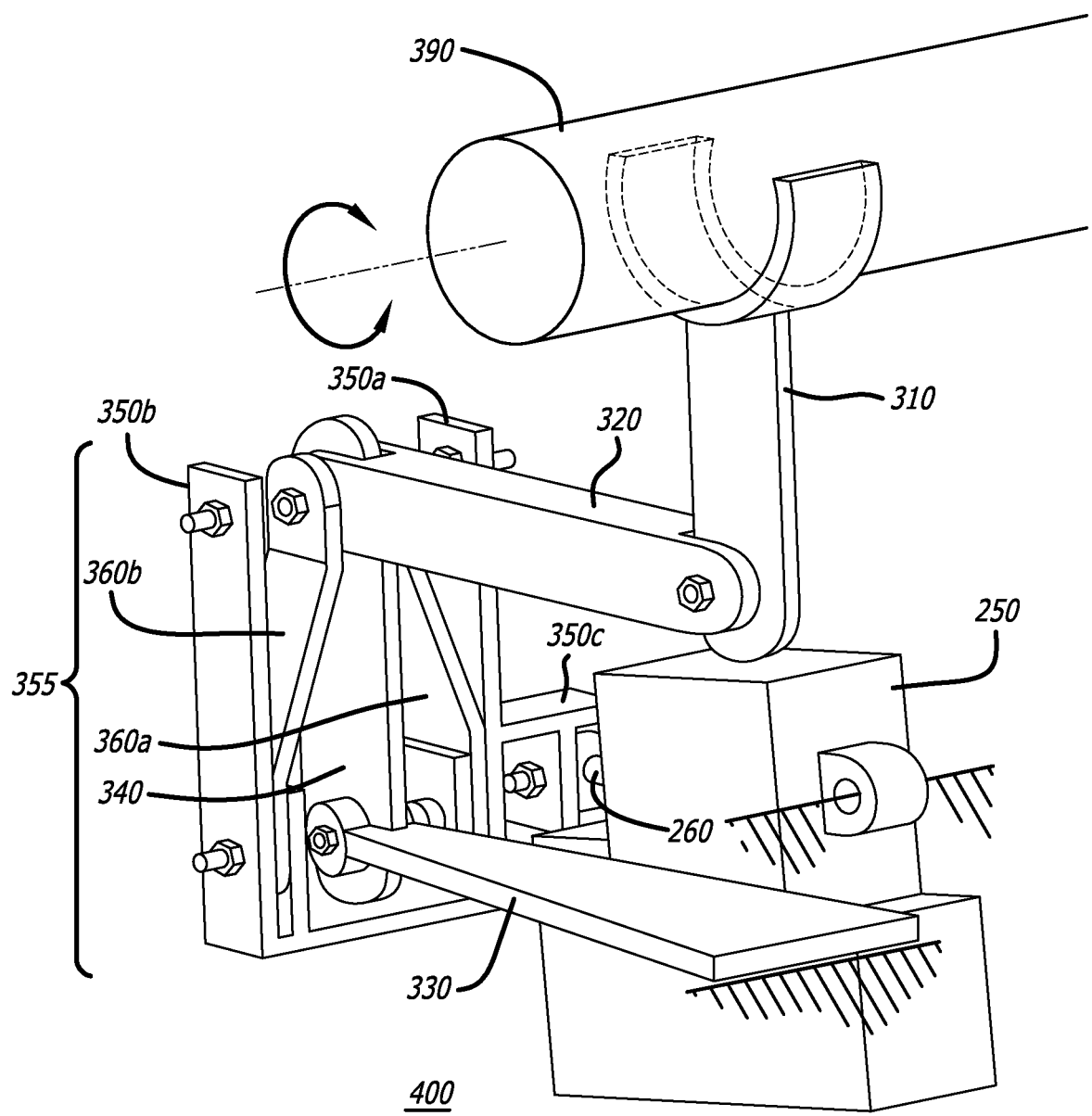
FIG. 4
 AIRFRAME STRUCTURE

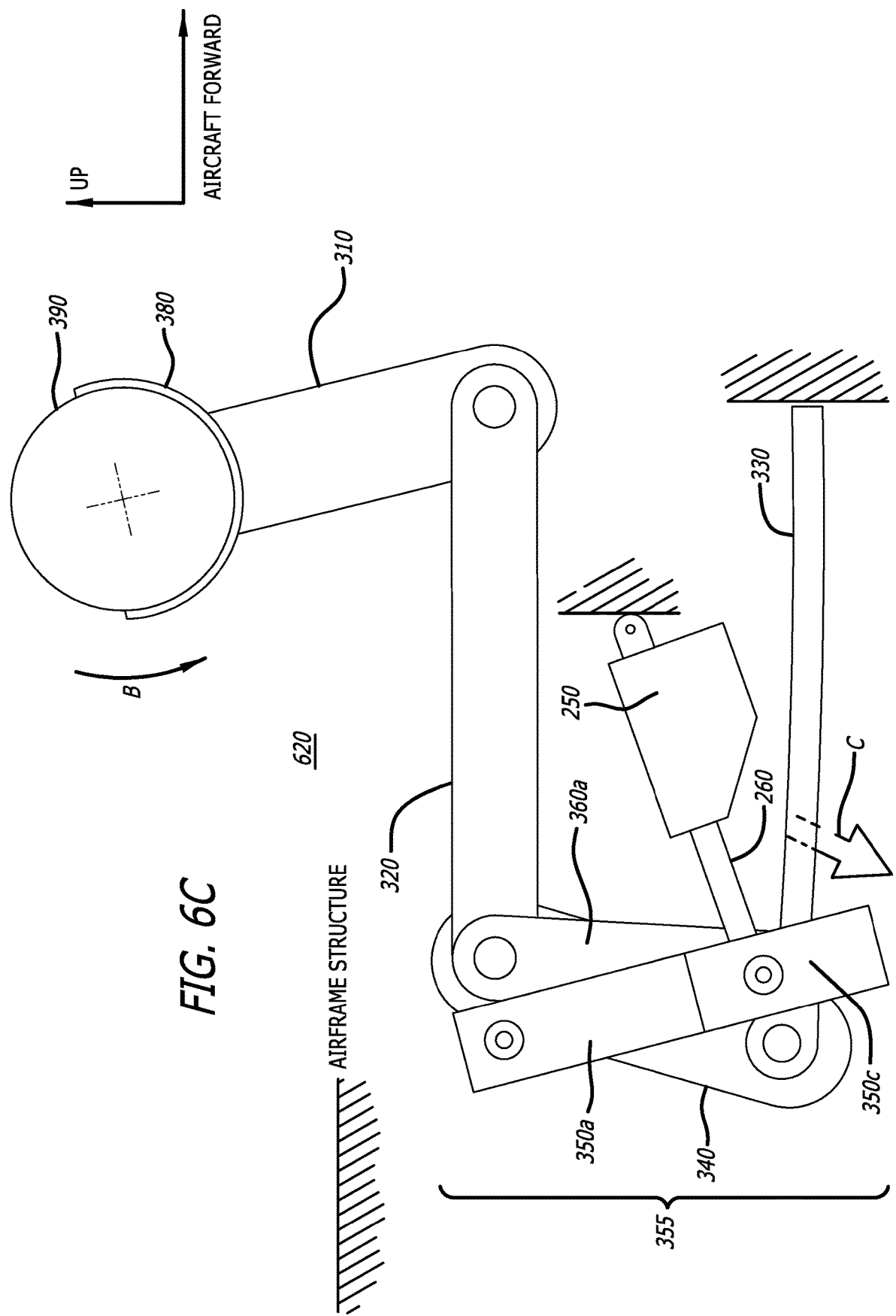

800

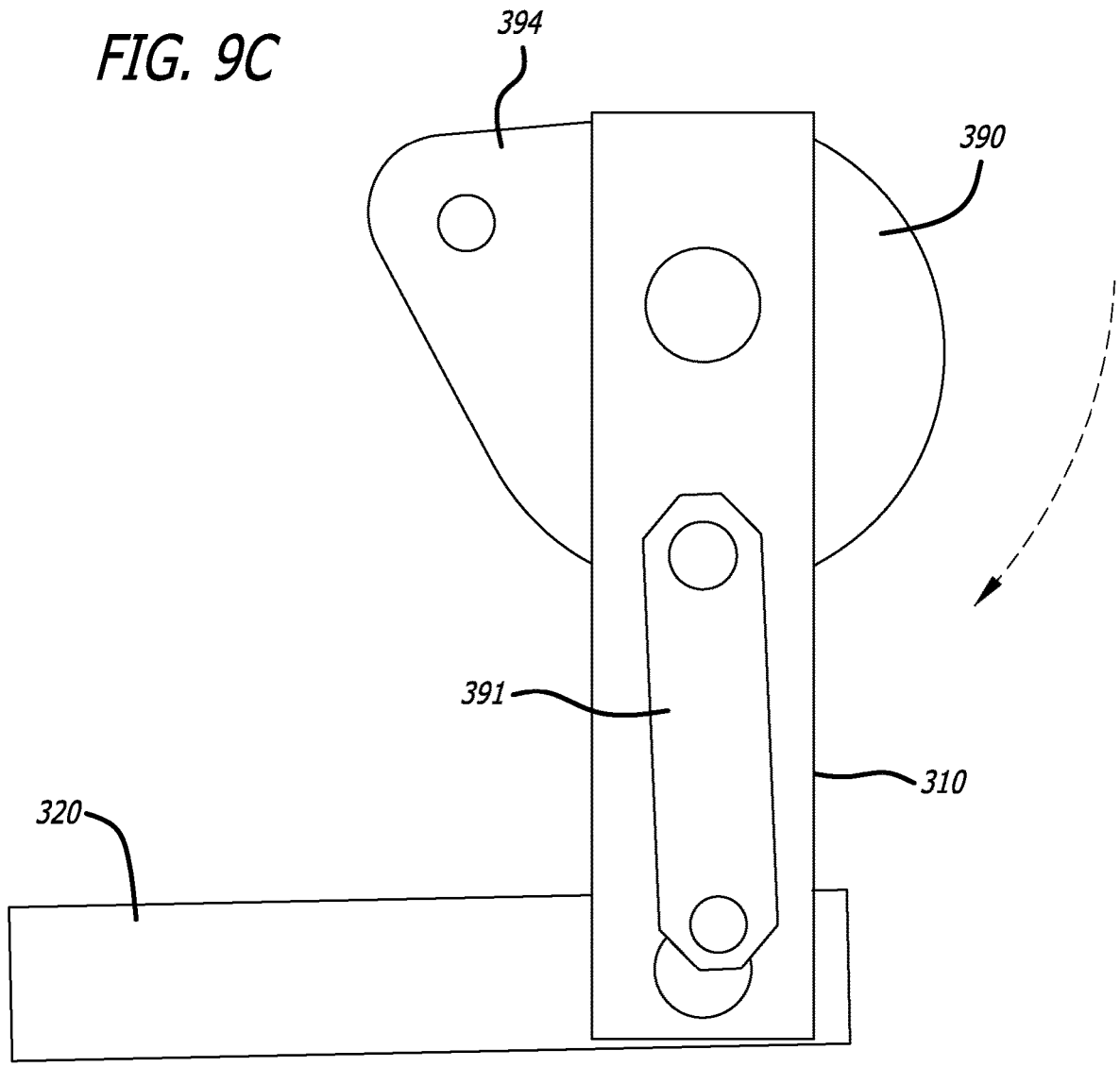

TAILSTRIKE AWARENESS SYSTEM

FIELD

The present disclosure relates to tailstrikes. In particular, it relates to a tailstrike awareness system (TSAS) to reduce the probability of the occurrence of an aircraft's tailstrike.

BACKGROUND

A tailstrike is an event in which the tail of the fuselage of a fixed-wing aircraft strikes the runway. Tailstrikes can occur during takeoff of the aircraft when the pilot pulls up on the pitch control inceptor too rapidly, thereby causing the tail of the aircraft fuselage to touch the runway. Tailstrikes can also occur during landing of the aircraft when the pilot raises the nose of the aircraft too aggressively, which is often the result of an attempt to land the aircraft closer to the threshold of the runway. Tailstrike incidents are rarely dangerous themselves. However, after a tailstrike incident occurs, the aircraft must be thoroughly inspected, and repairs may be difficult and expensive if the pressure hull is compromised.

Currently, to prevent tailstrikes, aircraft are either configured with a longer or semi-levered main landing gear; or with tilting main landing gear bogies, small tailwheels, or tailskids. The former solutions require a new or modified landing gear design, or a redesigning of the wheel well. The latter solutions require adding structural shock absorbing to the rear of the aircraft fuselage to compensate for the aircraft landing ground contact energy.

There is therefore a need for an improved technique for reducing the probability of the occurrence of an aircraft's tailstrike without requiring extensive and costly redesign or modification to the aircraft.

SUMMARY

The present disclosure relates to a method, system, and apparatus for reducing the probability of the occurrence of an aircraft's tailstrike. In one or more embodiments, a method for reducing a probability of an occurrence of a tailstrike for an aircraft comprising determining, by at least one processor of the aircraft, whether a tailstrike has a first probability of occurring by using tailstrike related data. The method further comprises producing, by an actuator of the aircraft, a tactile warning to a pilot of the aircraft, when at least one processor determines that the tailstrike has the first probability of occurring.

In one or more embodiments, the determining of whether the tailstrike has the first probability of occurring comprises: determining, by at least one processor, whether an aircraft pitch attitude is greater than a first probability threshold by using the tailstrike related data; and determining, by at least one processor, that the tailstrike has the first probability of occurring, when the aircraft pitch attitude is greater than the first probability threshold.

In at least one embodiment, the method further comprises determining, by at least one processor, whether a tailstrike has a second probability of occurring by using the tailstrike related data. Also, the method comprises displaying, on a display, a visual warning, and/or sounding, by a speaker, an audible warning, when at least one processor determines that the tailstrike has the second probability of occurring.

In one or more embodiments, the determining of whether the tailstrike has the second probability of occurring comprises: determining, by at least one processor, whether an aircraft pitch attitude is greater than a second probability threshold by using the tailstrike related data; and determining, by at least one processor, that the tailstrike has the second probability of occurring, when the aircraft pitch attitude is greater than the second probability threshold.

In at least one embodiment, the tailstrike related data comprises aircraft systems set for takeoff or landing configuration, speedbrake system status, engine thrust control status, high lift system status, landing gear status, aircraft altitude, pilot pitch input force, airport data of aircraft dynamics, aircraft pitch attitude, aircraft sink rate, and/or aircraft angle of attack. In some embodiments, the tactile warning is a force and/or a vibration applied to a pitch control inceptor in a cockpit of the aircraft.

In one or more embodiments, the actuator is connected to the pitch control inceptor via a linkage mechanism. In some embodiments, the linkage mechanism is connected to a leaf spring, helical spring, or an elastic object. The actuator changes the mechanical advantage between the leaf spring and the pitch control inceptor. In one or more embodiments, the producing of the tactile warning comprises moving, by changing a stroke of the actuator and deforming the leaf spring, the linkage mechanism to provide a force on the pitch control inceptor, which is felt by the pilot of the aircraft.

In at least one embodiment, the aircraft comprises a fly-by-wire flight control system or does not comprise a fly-by-wire flight control system. In some embodiments, characteristics of the tactile warning comprise: a magnitude of pilot input force is a function of actuator stroke, the pilot input force is smoothly increased when the tailstrike has the first probability of occurring, the pilot input force is smoothly ramped out when the tailstrike no longer has the first probability of occurring, and/or there are at least two distinct force gradients for the actuator stroke. In at least one embodiment, during normal flight control mode, when foreign object debris (FOD) jams the linkage mechanism, the method further comprises disengaging the linkage mechanism from the pitch control inceptor, thereby allowing for unimpeded movement of the pitch control inceptor.

In at least one embodiment, the method further comprises determining, by at least one processor, whether the actuator can be fully extended. In some embodiments, the method further comprises activating a warning light associated with a health status of the actuator, by at least one processor, when at least one processor determines that the actuator cannot be fully extended.

In one or more embodiments, a system for reducing a probability of an occurrence of a tailstrike for an aircraft comprises at least one processor, of the aircraft, to determine whether a tailstrike has a first probability of occurring by using tailstrike related data. The system further comprises an actuator, of the aircraft, to produce a tactile warning to a pilot of the aircraft, if at least one processor determines that the tailstrike has the first probability of occurring.

In at least one embodiment, to determine whether the tailstrike has the first probability of occurring, at least one processor is further to determine whether an aircraft pitch attitude is greater than a first probability threshold by using the tailstrike related data; and to determine that the tailstrike has the first probability of occurring, if the aircraft pitch attitude is greater than the first probability threshold.

In one or more embodiments, at least one processor is further to determine whether a tailstrike has a second probability of occurring by using the tailstrike related data. In some embodiments, the system further comprises a display to display a visual warning and/or a speaker to sound an audible warning, if at least one processor determines that the tailstrike has the second probability of occurring.

In at least one embodiment, to determine whether the tailstrike has the second probability of occurring, at least one processor is further to determine whether an aircraft pitch attitude is greater than a second probability threshold by using the tailstrike related data; and to determine that the tailstrike has the second probability of occurring, if the aircraft pitch attitude is greater than the second probability threshold.

In one or more embodiments, to produce the tactile warning, a stroke of the actuator is changed and the leaf spring is deformed to move the linkage mechanism to provide a force on the pitch control inceptor, which is to be felt by the pilot of the aircraft.

The features, functions, and advantages can be achieved independently in various embodiments of the present disclosure or may be combined in yet other embodiments.

DRAWINGS

These and other features, aspects, and advantages of the present disclosure will become better understood with regard to the following description, appended claims, and accompanying drawings where:

FIG. 4 is a diagram showing an exemplary tailstrike awareness system (TSAS) mechanism that may be employed by the disclosed system for reducing the probability of the occurrence of an aircraft's tailstrike, in accordance with at least one embodiment of the present disclosure.

Figure 6A:
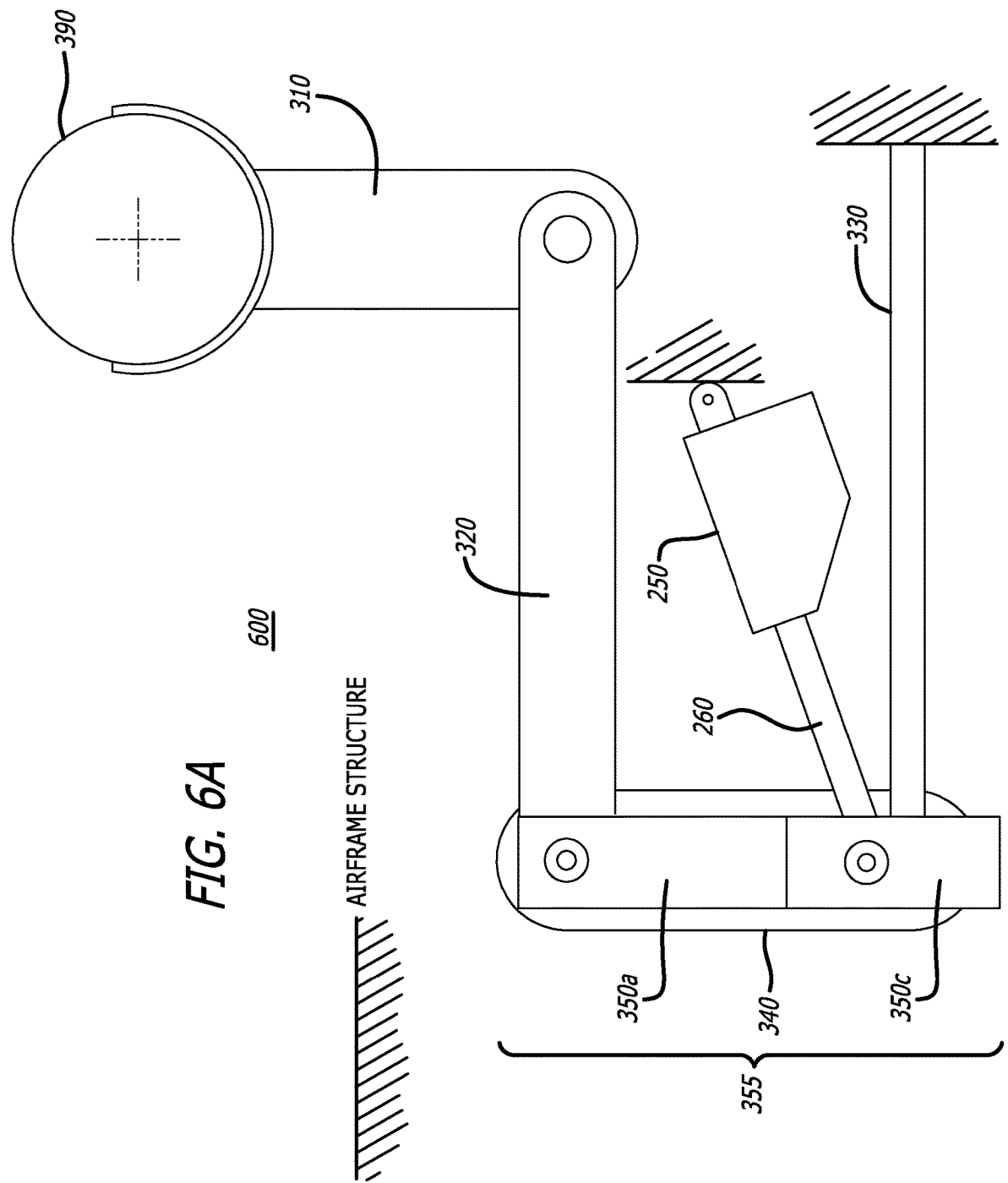
Figure 6B:
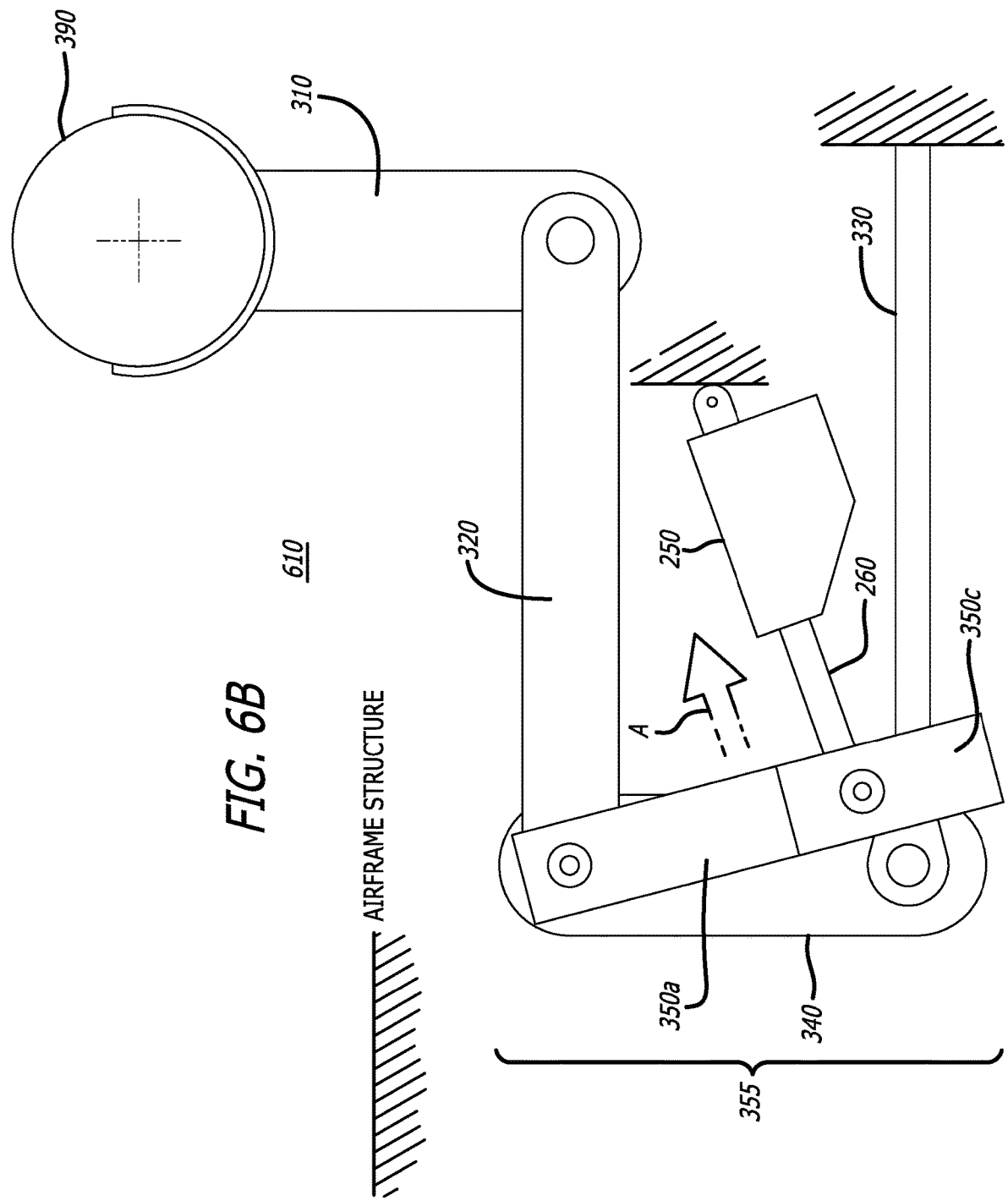

FIGS. 6A, 6B, and 6C are diagrams showing the side view of the TSAS mechanism of FIG. 4 that together illustrate the movement of the TSAS mechanism that occurs during operation of the disclosed system for reducing the probability of the occurrence of an aircraft's tailstrike, in accordance with at least one embodiment of the present disclosure.

Figure 7:
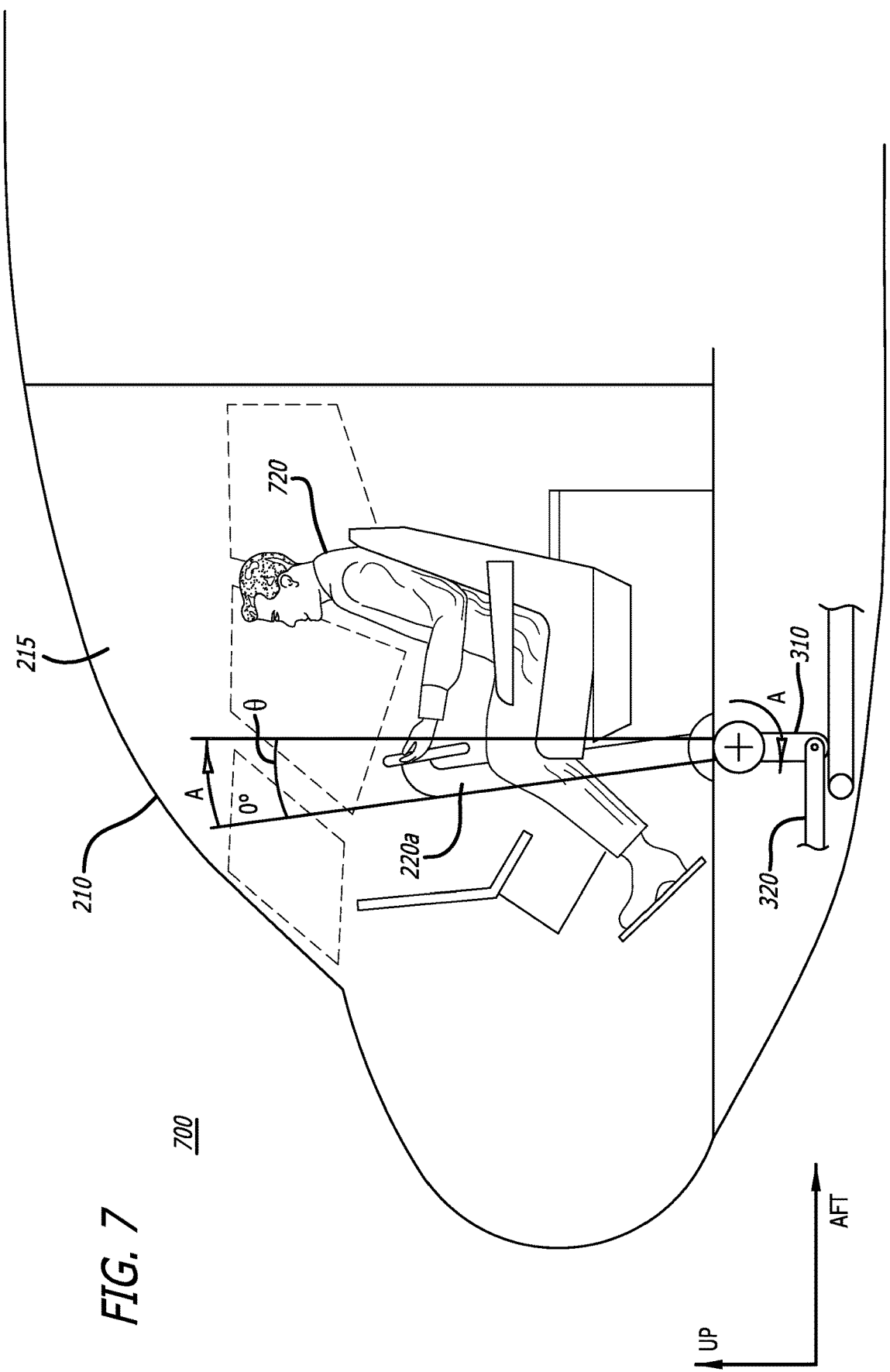

FIG. 7 is a diagram showing the pilot pulling aft on a typical pitch control inceptor in the cockpit of the aircraft, in accordance with at least one embodiment of the present disclosure.

Figure 8:
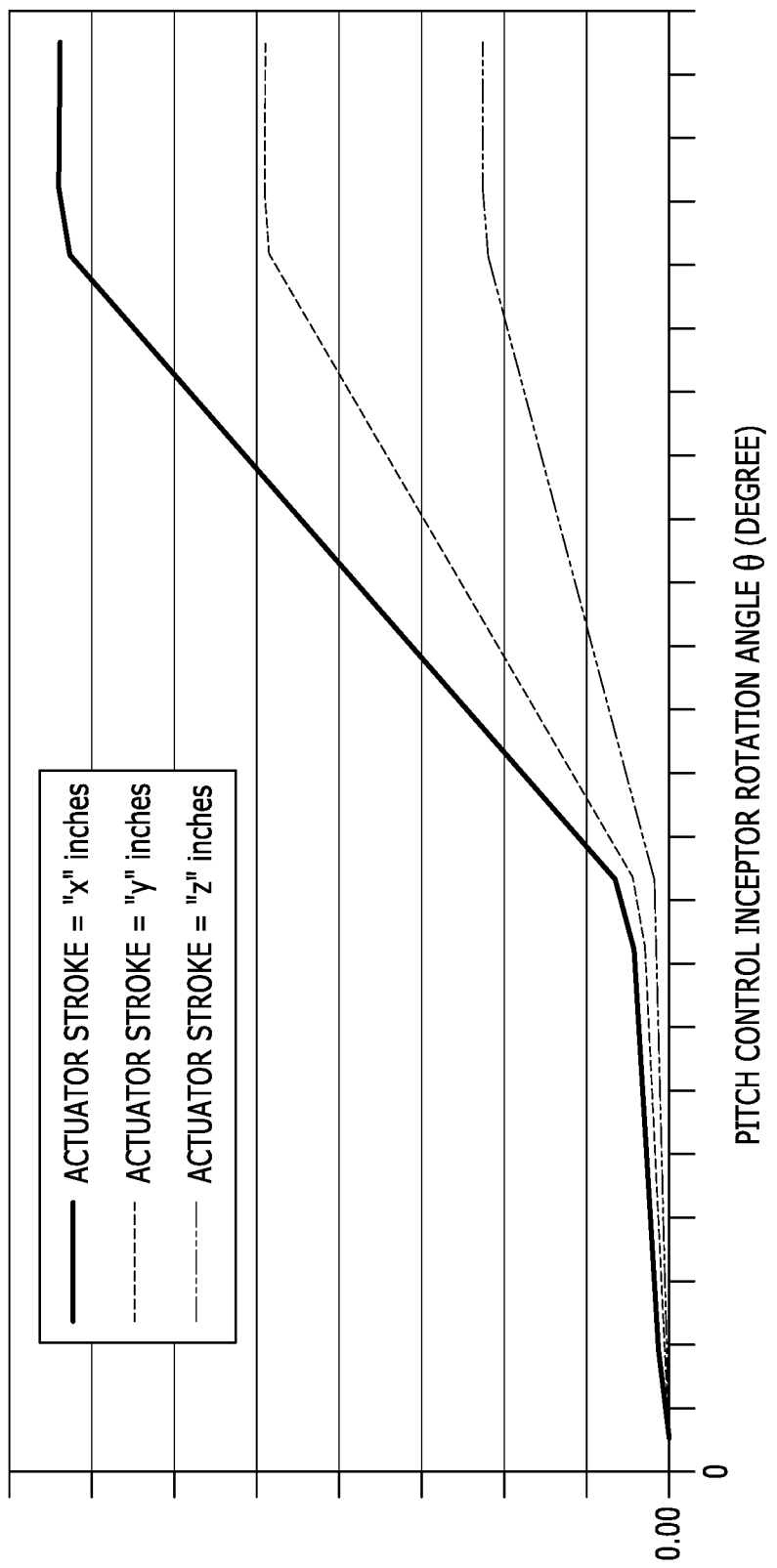

FIG. 8 is a graph depicting the pitch control inceptor rotation angle versus the pilot input force being applied by the TSAS mechanism versus the amount of actuator stroke by the actuator of the disclosed system for reducing the probability of the occurrence of an aircraft's tailstrike, in accordance with at least one embodiment of the present disclosure.

FIGS. 9A, 9B, 9C, and 9D together show an additional embodiment for the disclosed system for reducing the probability of the occurrence of an aircraft's tailstrike where a safety mechanism is implemented into the TSAS mechanism to safeguard against the occurrence of foreign object debris (FOD) causing a jam in the linkage mechanism that leads to impeding pilot movement of the pitch control inceptor during normal flight control mode, in accordance with at least one embodiment of the present disclosure.

Figure 9A:
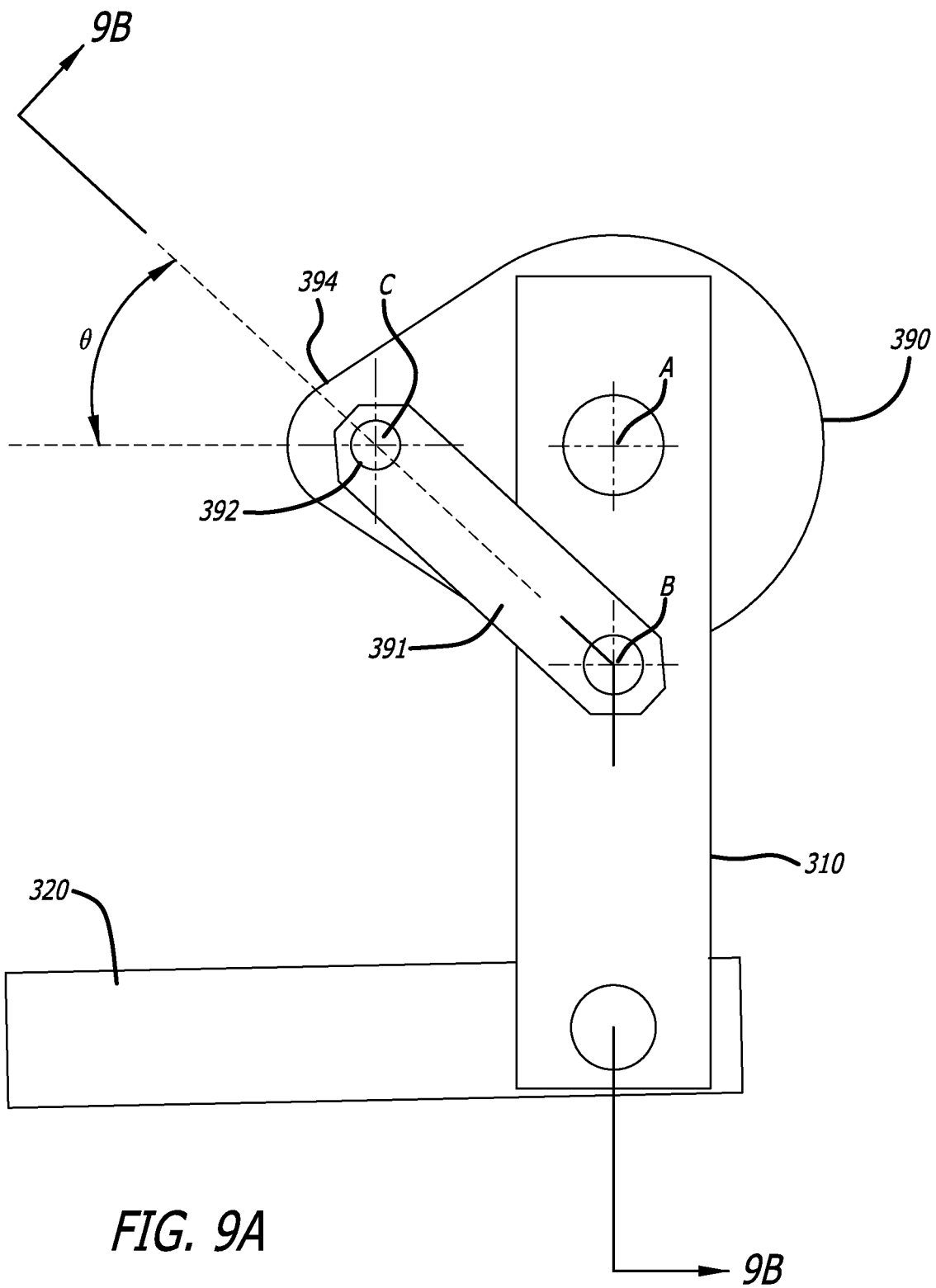

FIG. 9A is a diagram showing a side view of a portion of the TSAS mechanism that employs an additional link and a fuse, in accordance with at least one embodiment of the present disclosure.

Figure 9B:
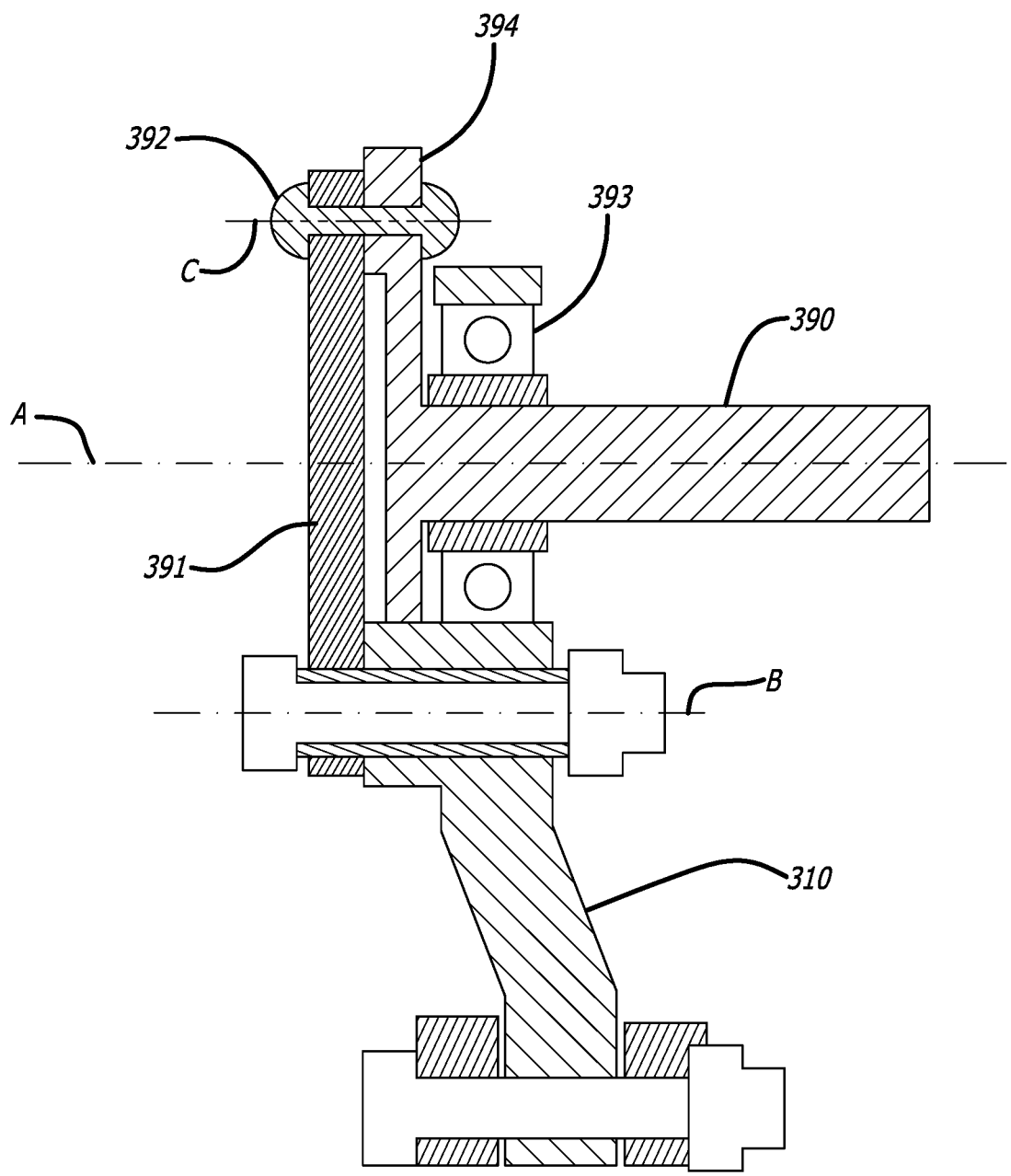

FIG. 9B is a diagram showing a cut-away front view of a portion of the TSAS mechanism that employs an additional link and a fuse, in accordance with at least one embodiment of the present disclosure.

Figure 9D:
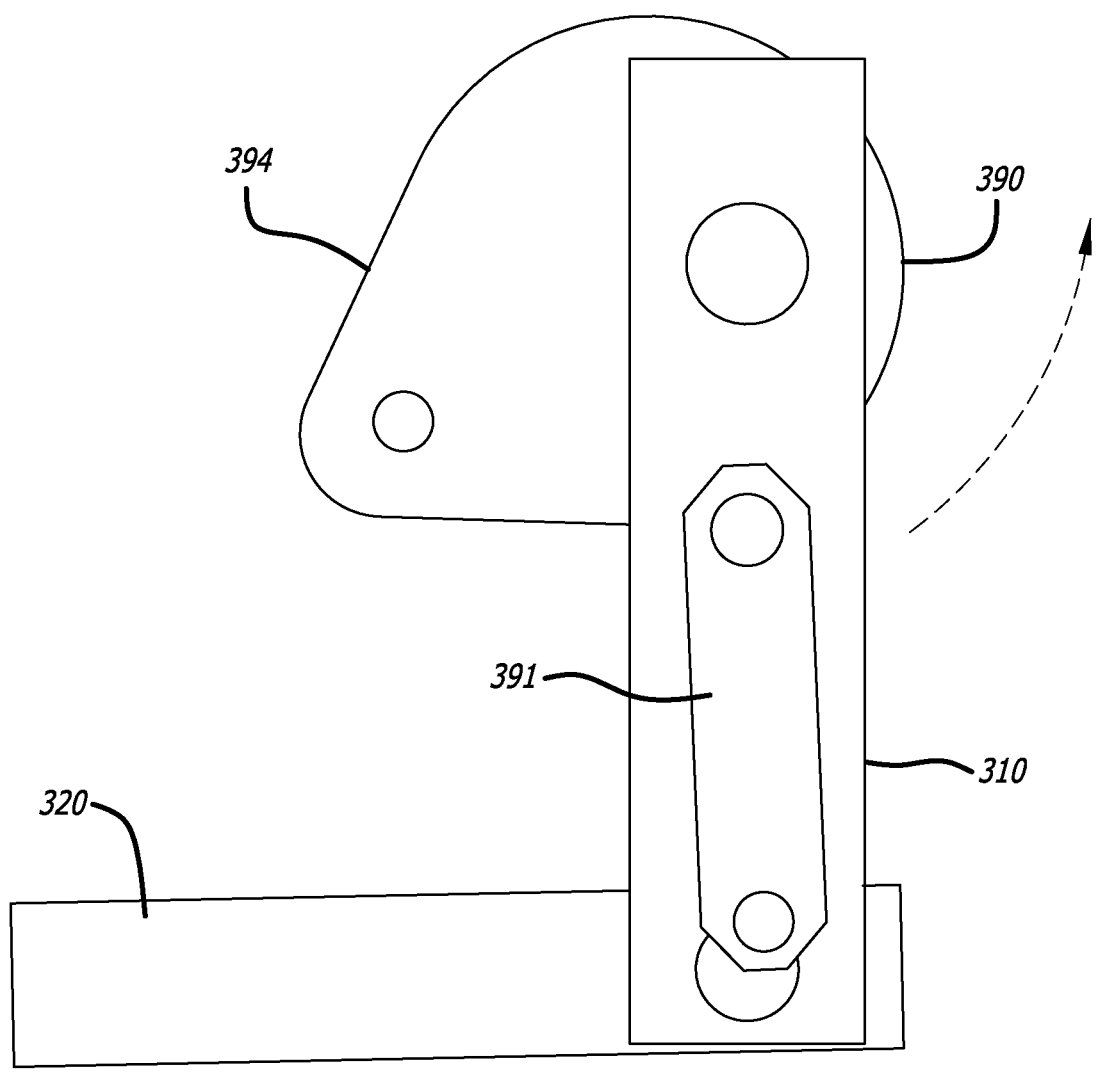

FIGS. 9C and 9D are diagrams showing a side view of a portion of the TSAS mechanism that employs an additional link with the fuse sheared, in accordance with at least one embodiment of the present disclosure.

DESCRIPTION

The methods and apparatus disclosed herein provide an operative system for reducing the probability of the occurrence of an aircraft's tailstrike. In one or more embodiments, the system of the present disclosure provides a tactile warning to an aircraft pilot of an imminent tailstrike occurring.

As previously mentioned above, a tailstrike is an inadvertent contact of the tailskid or aft body of an aircraft with a runway during takeoff or landing of a fixed-wing or rotary wing aircraft. Tailstrikes can occur during takeoff of the aircraft when the pilot pulls up on the control inceptor too rapidly, thereby causing the tail of the aircraft fuselage to touch the runway. Additionally, tailstrikes can occur during landing of the aircraft when the pilot raises the nose of the aircraft too aggressively, which is often the result of an attempt to land the aircraft closer to the threshold of the runway. An aggressive aft movement of the pitch control inceptor in conjunction with gusts of wind, a steep approach to the runway, a late flare of the aircraft, and/or a high sink rate near the ground result in a tailstrike. Tailstrike incidents are rarely dangerous themselves. However, after a tailstrike incident occurs, the aircraft must be thoroughly inspected, and repairs may be difficult and expensive if the pressure hull is compromised.

Conventionally, to prevent tailstrikes, aircraft are either configured with a longer or semi-levered main landing gear; or with tilting main landing gear bogies, small tailwheels, or tailskids. The former solutions require a new or modified landing gear design, or a redesigning of the wheel well. The latter solutions require adding structural shock absorbing to the rear of the aircraft fuselage to compensate for the aircraft landing ground contact energy.

The system of the present disclosure aims to reduce tailstrike incidents by quickly providing feedback in the form of a tactile warning to the pilot of an imminent tailstrike so that the pilot can focus on the appropriate control input to the aircraft to avoid the tailstrike. During operation of the disclosed system, the system receives tailstrike related data, such as aircraft dynamics and external conditions (e.g., aircraft takeoff or landing configuration, aircraft angle of attack, etc.), to determine whether a tailstrike has a first probability of occurring and, if so, the system provides a resistant force (and/or vibration) on the pitch control inceptor, which is felt by the pilot.

In the following description, numerous details are set forth in order to provide a more thorough description of the system. It will be apparent, however, to one skilled in the art, that the disclosed system may be practiced without these specific details. In the other instances, well known features have not been described in detail so as not to unnecessarily obscure the system.

Embodiments of the present disclosure may be described herein in terms of functional and/or logical components and various processing steps. It should be appreciated that such components may be realized by any number of hardware, software, and/or firmware components configured to perform the specified functions. For example, an embodiment of the present disclosure may employ various integrated circuit components (e.g., memory elements, digital signal processing elements, logic elements, look-up tables, or the like), which may carry out a variety of functions under the control of one or more processors, microprocessors, or other control devices. In addition, those skilled in the art will appreciate that embodiments of the present disclosure may be practiced in conjunction with other components, and that the system described herein is merely one example embodiment of the present disclosure.

For the sake of brevity, conventional techniques and components related to aircraft systems, and other functional aspects of the system (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
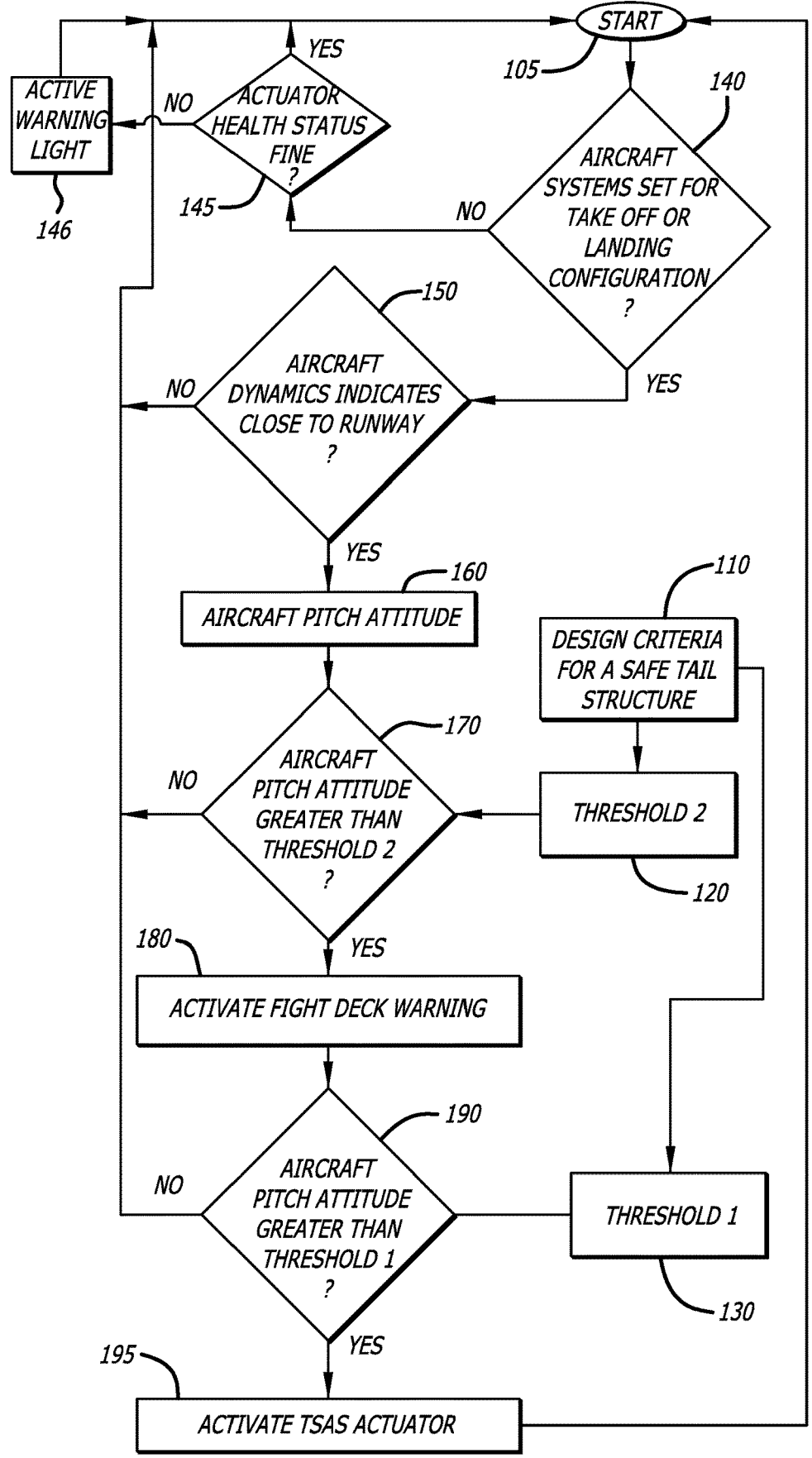
FIG. 1 is a flow chart showing the disclosed method for reducing the probability of the occurrence of an aircraft's tailstrike, in accordance with at least one embodiment of the present disclosure.

FIG. 1 is a flow chart showing the disclosed method 100 for reducing the probability of the occurrence of an aircraft's tailstrike, in accordance with at least one embodiment of the present disclosure. At the start of the method, design criteria (e.g., the aircraft dimensions and features for the specific model of aircraft) for a safe tail structure on an aircraft 110 is utilized, by at least one processor (e.g., refer to 245 on FIG. 2), to generate threshold 2 (i.e. a second probability threshold) 120 and threshold 1 (i.e. a first probability threshold) 130. Threshold 1 indicates a higher probability of a tailstrike occurring than threshold 2. It should be noted that threshold 1 and threshold 2 may be determined during the design phase of the aircraft, when the aircraft configuration is still in the define design phase, and/or by a software update for at least one processor on the aircraft during flight test phase of the aircraft.

In addition, it should be noted that during the method 100, at least one processor on the aircraft analyzes tailstrike related data (e.g., speedbrake system status, engine thrust control status, high lift system status, landing gear status, aircraft altitude, pilot pitch input force, aircraft pitch attitude, aircraft sink rate, and aircraft angle of attack) to determine whether a tailstrike occurrence is imminent. If the processor(s) determines that a tailstrike occurrence is imminent, then a flight deck warning and/or a tactile warning is activated to warn the pilot.

At the start 105 of the method 100, during operation of the aircraft, at least one processor analyzes the aircraft systems configuration (e.g., speedbrake system status, engine thrust control status, high lift system status, landing gear status, and pilot communication data with the airport) to determine whether the aircraft systems are set for a takeoff configuration or a landing configuration 140.

Figure 3A:
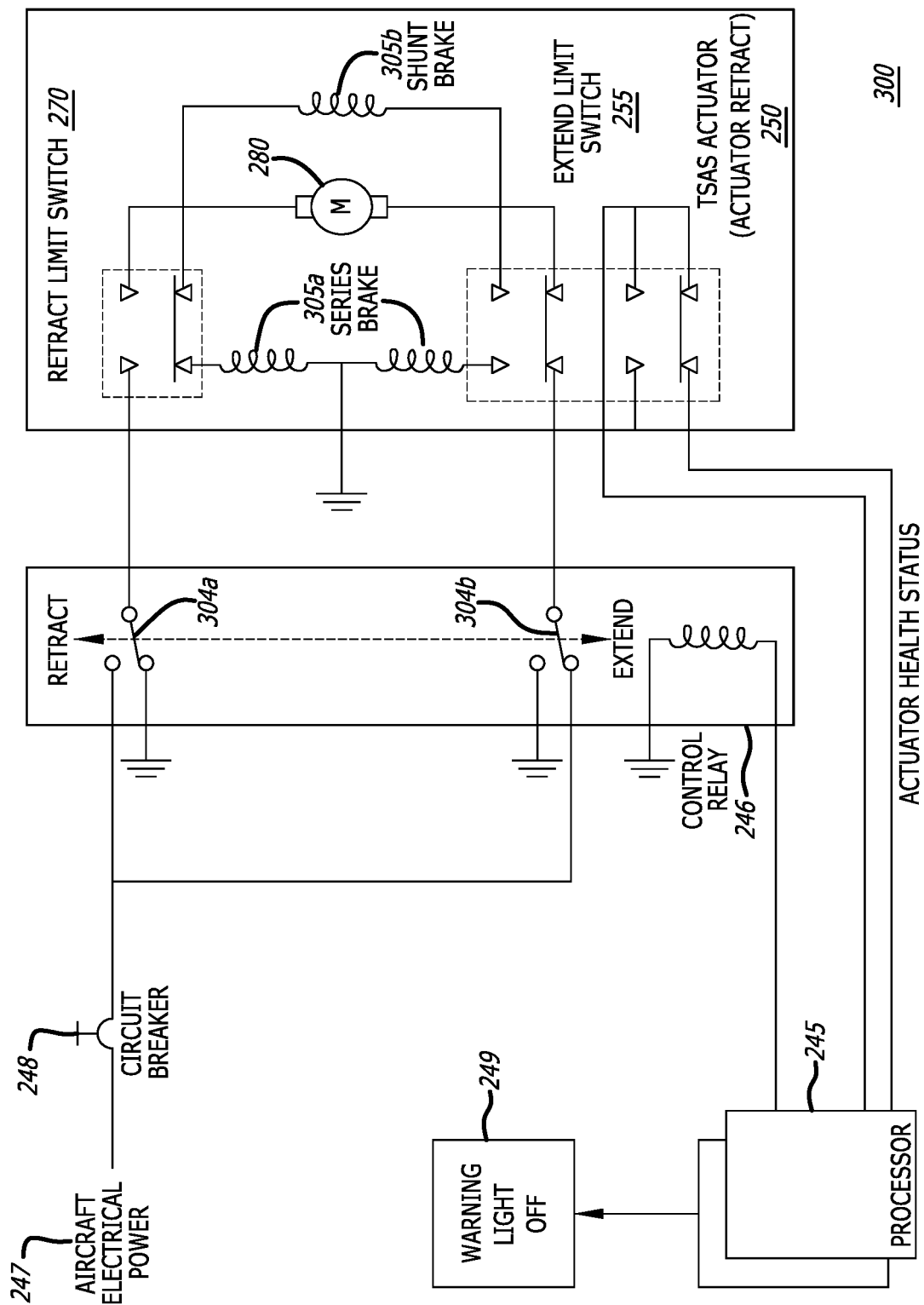
FIG. 3A is a diagram illustrating the electrical system elements employed by the disclosed system for reducing the probability of the occurrence of an aircraft's tailstrike when the actuator is extended, in accordance with at least one embodiment of the present disclosure.
Figure 3B:
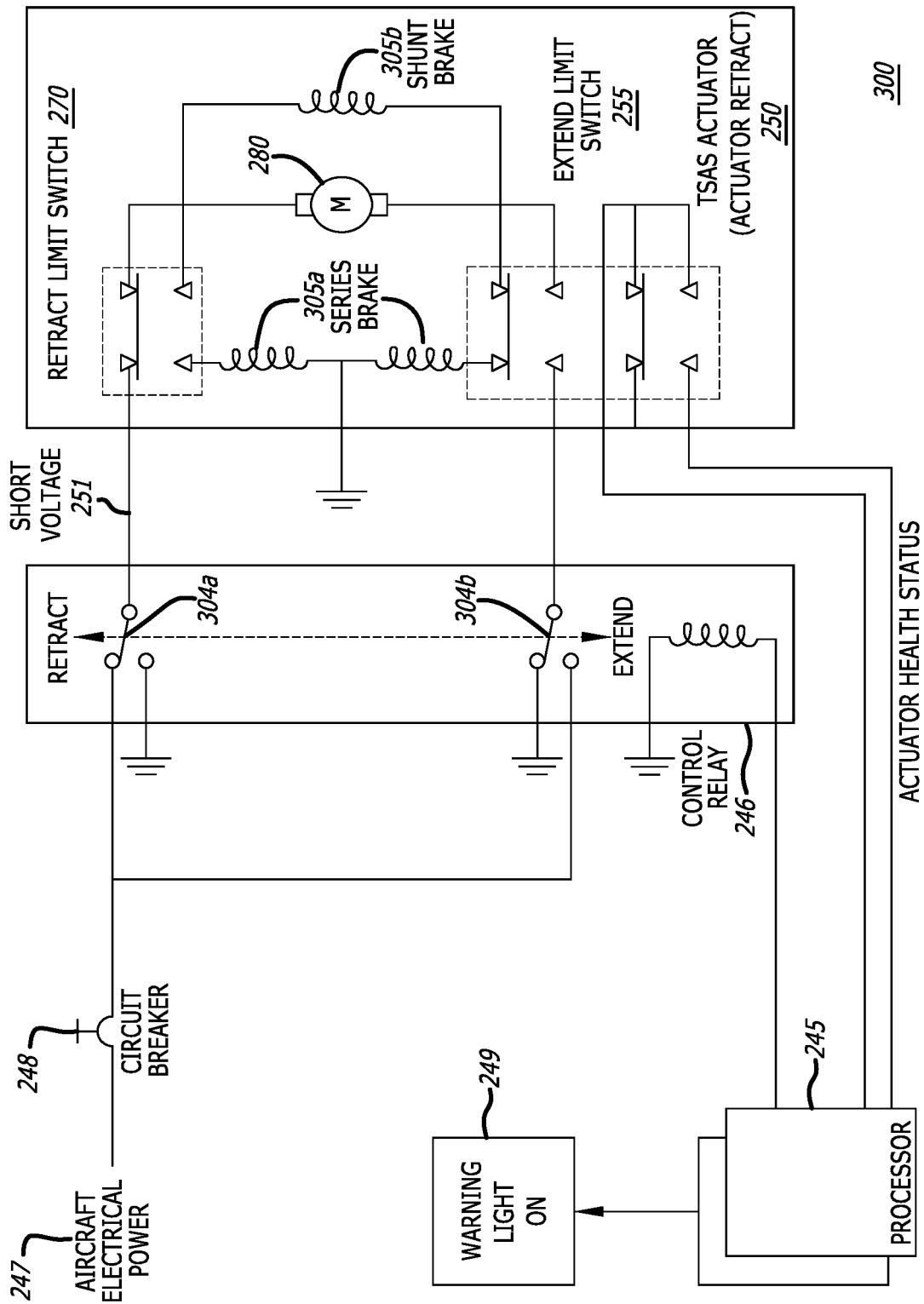
FIG. 3B is a diagram illustrating the electrical system elements employed by the disclosed system for reducing the probability of the occurrence of an aircraft's tailstrike when the system is experiencing a short and the actuator is retracted, in accordance with at least one embodiment of the present disclosure.
Figure 3C:
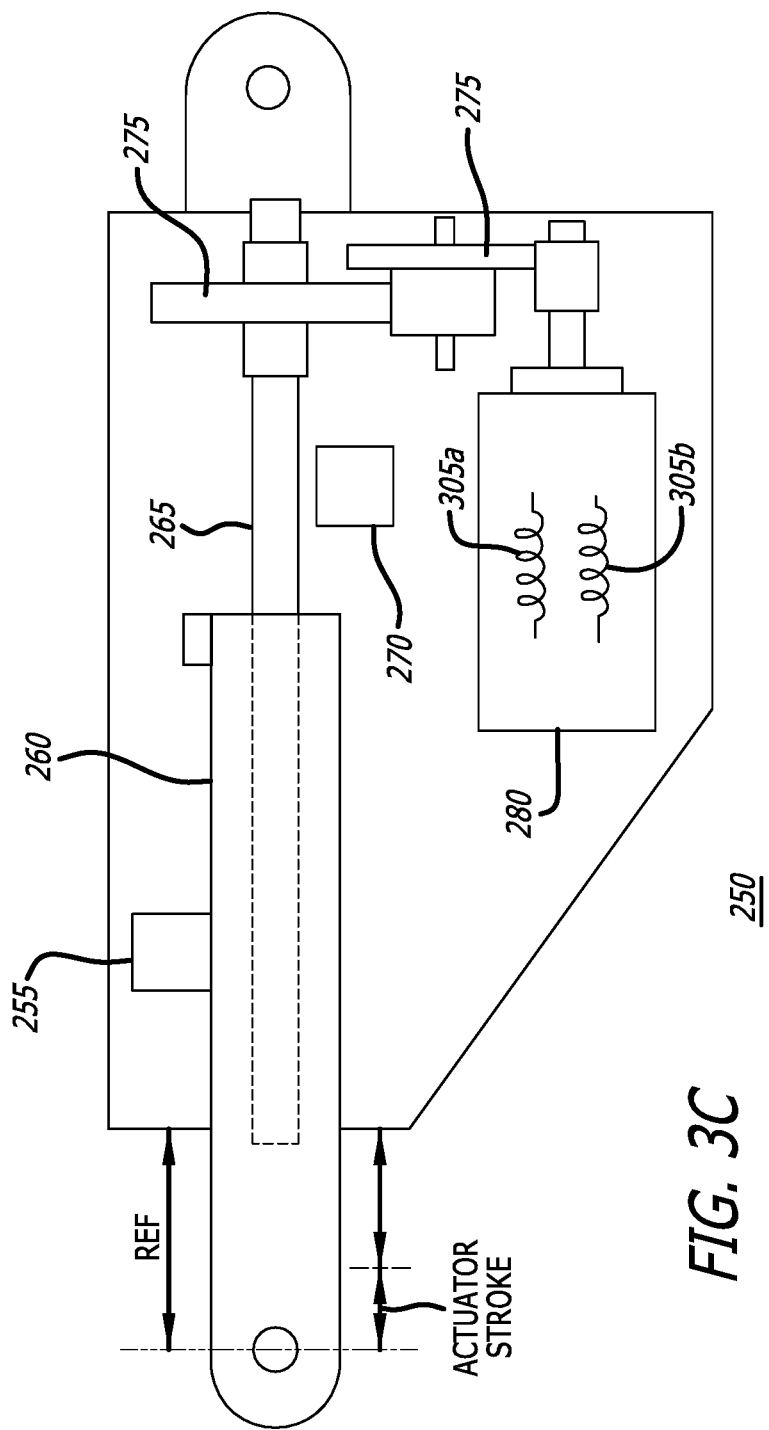
FIG. 3C is a diagram showing an exemplary actuator that may be employed by the disclosed system for reducing the probability of the occurrence of an aircraft's tailstrike, in accordance with at least one embodiment of the present disclosure.

If the processor(s) determines that the aircraft systems are not set for a takeoff configuration or a landing configuration, then the processor(s) determines whether the actuator health status is fine 145 by first determining whether the actuator stroke equals (=) zero (0) (i.e. determining whether the ball nut 260 of the actuator 250 is fully extended to its reference position (REF), refer to FIG. 3C). If the processor(s) determines that the actuator stroke equals zero, then the processor(s) determines that the actuator health status is fine, and the method 100 proceeds back to the start 105.

However, if the processor(s) determines that the actuator stroke is not equal to zero, then the processor(s) commands the actuator (refer to 250 of FIG. 3C) to attempt to fully extend its ball nut (refer to 260 of FIG. 3C) to its reference position such that the actuator stroke is equal to zero. If the actuator is able to fully extend such that the actuator stroke is equal to zero, then the processor(s) determines that the actuator health status is fine, and the method 100 proceeds back to the start 105.

However, if the actuator is not able to fully extend such that the actuator stroke is equal to zero, then the processor(s) determines that the actuator health status is not fine, and the a warning light (refer to 249 of FIG. 3A) indicating that the actuator is unable to fully extend is activated (i.e. illuminated) 146. It should be noted that various different types of warnings may be utilized for the warning light including, but not limited to, at least one light and/or textual warning displayed on a display on the flight deck of the cockpit of the aircraft. When the warning light is activated, the pilot is notified that since the actuator is unable to fully extend, the pilot will need to use extra force on the pitch control inceptor (refer to 220a in FIG. 2) during normal flight control mode. Then, the method 100 proceeds back to the start 105.

If the processor(s) determines that the aircraft systems are set for a takeoff configuration or a landing configuration, then the processor(s) analyzes the aircraft dynamics relative to the runway (e.g., aircraft altitude, aircraft location, aircraft sink rate, and aircraft angle of attack) to determine whether the aircraft is close to the runway (i.e. low to the ground) by a predetermined distance 150. If the processor(s) determines that the aircraft is not close to the runway, then the method 100 repeats to the start 105.

However, if the processor(s) determines that the aircraft is close to the runway, then the processor(s) determines the aircraft pitch attitude by, for example, analyzing some or all of the tailstrike related data 160. Then, the processor(s) determines whether the aircraft pitch attitude is greater than threshold 2 (i.e. a second probability threshold). If the processor(s) determines that the aircraft pitch attitude is not greater than threshold 2, then the method repeats to the start 105.

However, if processor(s) determines that the aircraft pitch attitude is greater than threshold 2, then a flight deck warning is activated 180. Various different types of warnings may be utilized for the flight deck warning including, but not limited to, visual warnings (e.g., at least one light and/or textual warning displayed on a display on the flight deck of the cockpit of the aircraft) and audible warnings (e.g., at least one sound and/or word sounded by a speaker in the cockpit).

Then, the processor(s) determines whether the aircraft pitch attitude is greater than threshold 1 (i.e. a first probability threshold) 190. If the processor(s) determines that the aircraft pitch attitude is not greater than threshold 1, then the method 100 repeats to the start 105.

However, if processor(s) determines that the aircraft pitch attitude is greater than threshold 1, then a tailstrike awareness system (TSAS) actuator is activated 195. When activated, the TSAS actuator provides a tactile warning in the form of a resistant force (and/or vibration) on the pitch control inceptor, which is felt by the pilot. Then, the method 100 repeats to the start 105.

It should be noted that there are many various different ways a tactile warning in the form of a resistant force (and/or vibration) on the pitch control inceptor may be implemented to warn the pilot of an imminent tailstrike. The description below of the following figures discloses exemplary embodiments for providing a tactile warning to the pilot of an imminent tailstrike occurrence.

Figure 2:
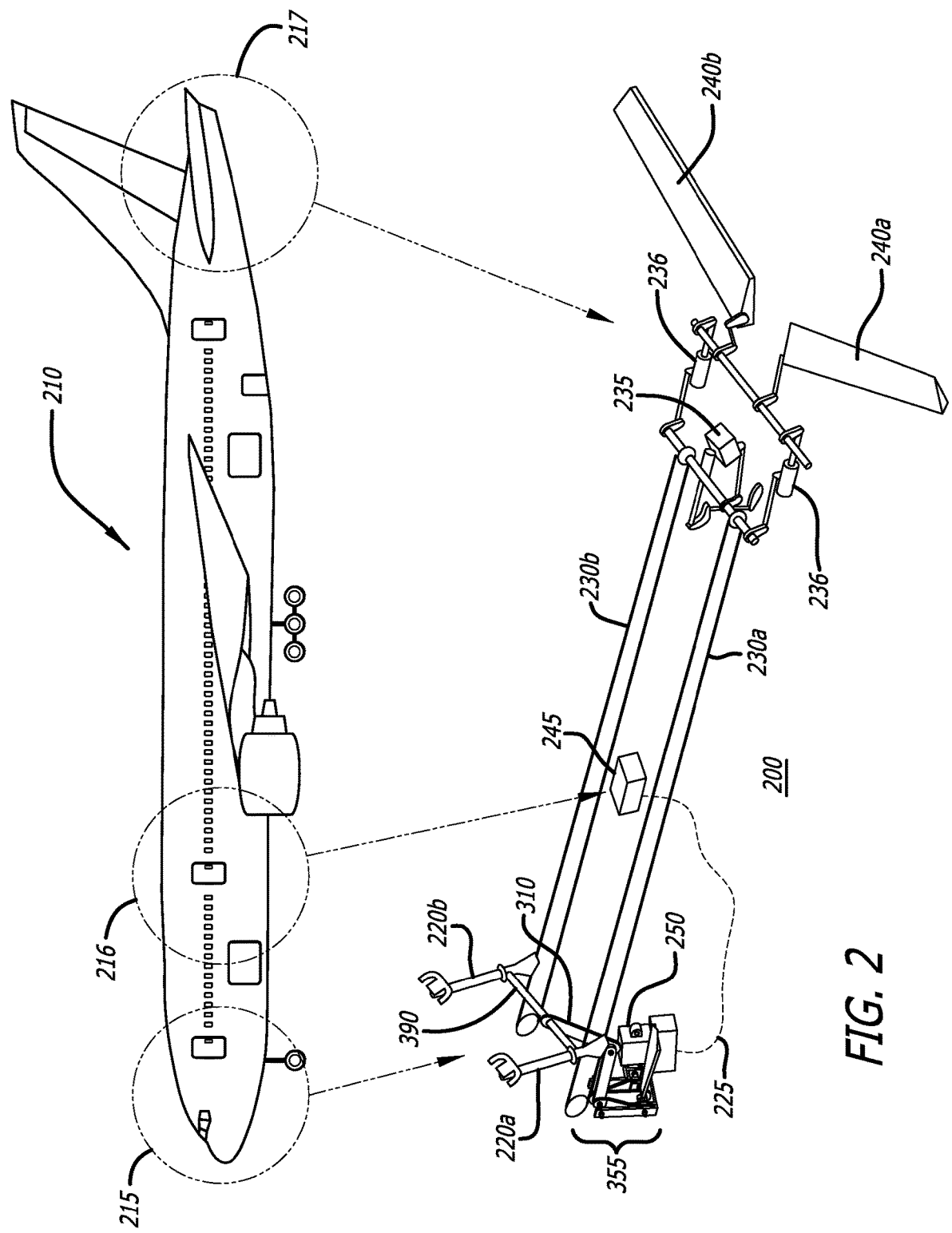
FIG. 2 is a diagram illustrating the disclosed system for reducing the probability of the occurrence of an aircraft's tailstrike, in accordance with at least one embodiment of the present disclosure.

FIG. 2 is a diagram illustrating the disclosed system 200 for reducing the probability of the occurrence of an aircraft's tailstrike, in accordance with at least one embodiment of the present disclosure. In this figure, the system 200 of the aircraft 210 is extracted from the aircraft 210 to show its details. The system 200 is shown to comprise two pitch control inceptors 220a, 220b (i.e. the captain pitch control inceptor 220a and the first officer pitch control inceptor 220b), which are both located inside the cockpit 215 of the aircraft 210. The two pitch control inceptors 220a, 220b are connected to each other via a crossbar 390.

It should be noted that in other embodiments, the two pitch control inceptors 220a and 220b are not connected to each other via a crossbar 390. For these embodiments, a separate tailstrike awareness system (TSAS) will be employed for each pitch control inceptor 220a, 220b (i.e. each pitch control inceptor 220a, 220b will have its own dedicated actuator 250 and linkage mechanism 355).

Each pitch control inceptor 220a, 220b is connected to a respective cable 230a, 230b. The cables 230a, 230b are both connected to a feel and centering unit 235 and elevator actuators 236, which are located within the tail 217 of the fuselage of the aircraft 210. The feel and centering unit 235 provides an artificial feel force for the pilot during normal flight control mode. The elevator actuators 236 control the movement of the left elevator 240a and the right elevator 240b of the aircraft 210 according to the movement of the pitch control inceptors 220a, 220b.

Also in this figure, an actuator 250 is shown to be connected to a linkage mechanism 355. The linkage mechanism is connected to the crossbar 390 via a pitch inceptor 310. A flight computer (e.g., a processor(s)) 245 that comprises at least one processor as well as the tailstrike awareness system (TSAS) logic for the operation of the disclosed system and method is shown to be located within the electronics bay 216 of the aircraft 210. The flight computer 245 processes and commands aspects of flight of the aircraft 210 including, but not limited to, the aircraft's dynamics and system settings. The flight computer 245 communicates with the actuator 250 via wire 225 and control relay 246 (refer to FIG. 3A). During operation, the flight computer 245 sends commands to the actuator 250 via wire 225 to cause movement to the linkage mechanism 355. Movement of the linkage mechanism 355 demands a pilot pitch inceptor force, which the pilot has to apply to the pitch control inceptor 220a in order to move the pitch inceptor away from its neutral position (i.e. away from zero (0) degrees, refer to FIG. 7).

FIG. 3A is a diagram illustrating the electrical system elements employed by the disclosed system for reducing the probability of the occurrence of an aircraft's tailstrike when the actuator 250 is extended, in accordance with at least one embodiment of the present disclosure. During operation of the disclosed system, if a processor(s) (e.g., within the flight computer) 245 determines that the aircraft pitch attitude is not greater than threshold 1 (i.e. indicating a normal flight control mode where a tailstrike occurrence is not imminent), then the processor(s) 245 confirms that the ball nut 260 (refer to FIG. 3C) of the actuator 250 is fully extended. If the processor 245 determines that the ball nut 260 is not fully extended, then the processor 245 sends at least one command (i.e. a TSAS actuator command) to the control relay 246. When this is done, the limit switch 304a is open (as shown in FIG. 3A) and the limit switch 304b is closed (as shown in FIG. 3A) and, as such, the aircraft electrical power 247 is connected to the motor 280 (via a circuit breaker 248), which causes the actuator 250 to fully extend its ball nut 260 such that the actuator stroke is equal to zero (refer to FIG. 3C). Since the actuator 250 is able to be fully extended, the warning light 249 is not activated ("OFF").

However, if the processor(s) 245 determines that the aircraft pitch attitude is greater than threshold 1 (i.e. indicating that a tailstrike occurrence is imminent), then the processor(s) 245 sends at least one command (i.e. a TSAS actuator command) to the actuator 250 via control relay 246 (refer to FIG. 3A) to switch limit switch 304a closed (not shown in FIG. 3A) and switch limit switch 304b open (not shown in FIG. 3A). When this is done, aircraft electrical power 247 is connected to the motor 280 (via a circuit breaker 248), which causes the actuator 250 to retract its ball nut 260 (refer to FIG. 3C).

FIG. 3B is a diagram illustrating the electrical system elements employed by the disclosed system for reducing the probability of the occurrence of an aircraft's tailstrike when the system is experiencing a short and the actuator 250 is retracted, in accordance with at least one embodiment of the present disclosure. During operation of the disclosed system, if the processor(s) determines that the aircraft systems are not set for a takeoff configuration or a landing configuration, then the processor(s) determines whether the actuator health status is fine 145 by determining whether the actuator stroke equals (=) zero (0) (i.e. determining whether the ball nut 260 of the actuator 250 is fully extended to its reference position (REF), refer to FIG. 3C). In FIG. 3B, the short voltage 251 switches the extend limit switches 255 open (as shown in FIG. 3B) and switches retract limit switches 270 closed (as shown in FIG. 3B). When this is done, the aircraft electrical power 247 is connected to the motor 280 (via a circuit breaker 248), which causes the actuator 250 to retract its ball nut 260 (refer to FIG. 3C). Since the short voltage 251 does not allow for the ball nut 260 of the actuator 250 to be fully extended, a warning light 249 is activated ("ON") to notify the pilot is that the actuator 250 is unable to fully extend and, as such, the pilot will need to use extra force to pull up on the pitch control inceptor (refer to 220a in FIG. 2) during normal flight control mode.

FIG. 3C is a diagram showing an exemplary actuator 250 that may be employed by the disclosed system for reducing the probability of the occurrence of an aircraft's tailstrike, in accordance with at least one embodiment of the present disclosure. In this figure, the actuator 250 is shown to include a motor 280, which comprises a series brake 305a and a shunt brake 305b. The motor 280 is connected to reduction gearing 275, which is used to rotate a ball screw 265 (or other type of screw, which may be implemented for other embodiments). The rotation of the ball screw 265 (or other type of screw) produces a linear travel of the ball nut 260 (or other type of nut, which may be implemented for other embodiments) to extend or to retract.

During operation, when the ball screw 265 is rotated clockwise (or alternatively counter clockwise) by the reduction gearing 275, the ball nut 260 is extended out of the actuator 250 (i.e. moved to the left of FIG. 3C). An extend limit switch 255 limits the amount the ball nut 260 may be extended. Also during operation, when the ball screw 265 is rotated counter clockwise (or alternatively clockwise) by the reduction gearing 275, the ball nut 260 is retracted inside of the actuator 250 (i.e. moved to the right of FIG. 3C). A retract limit switch 270 limits the amount the ball nut 260 may be retracted. It should be noted that actuator stroke, which will be discussed in the description of FIG. 8, is in reference to the distance the ball nut 260 travels within the actuator 250 from a reference position (REF) (e.g., the fully extended position of the ball nut 260).

FIG. 4 is a diagram showing an exemplary tailstrike awareness system (TSAS) mechanism 400 that may be employed by the disclosed system for reducing the probability of the occurrence of an aircraft's tailstrike, in accordance with at least one embodiment of the present disclosure. In this figure, the TSAS mechanism 400 is shown to comprise a pitch inceptor 310, where one end of the pitch inceptor 310 is connected to the crossbar 390. The end of the pitch inceptor 310 may be connected to the crossbar 390 by various different means including, but not limited to, a crank (e.g., refer to FIG. 2). The opposite end of the pitch inceptor 310 is connected to a linkage mechanism 355 via a push rod 320 of the linkage mechanism 355. The TSAS mechanism 400 comprises all of the items depicted in FIG. 4 except for the crossbar 390.

The linkage mechanism 355 is shown to comprise, in addition to the push rod 320; outer bars 350a, 350b; outer bar clevis 350c; inner bars 360a, 360b; and middle bar 340. One end of the middle bar 340 of the linkage mechanism 355 is attached to a leaf spring 330, and the other end of the middle bar 340 is connected to push rod 320 and inner bars 360a and 360b (refer to FIG. 5). An end of the ball nut 260 of the actuator 250 is attached to the outer bar clevis 350c. It should be noted that in other embodiments, a helical spring or some sort of elastic object may be employed by the disclosed system instead of the leaf spring 330.

During operation of the disclosed system, when the processor(s) determines that the aircraft pitch attitude is greater than threshold 1 (i.e. indicating that a tailstrike occurrence is imminent), the ball nut 260 of the actuator 250 is retracted, which causes movement to the linkage mechanism 355. This movement of the linkage mechanism 355 causes a force that is applied to the pitch control inceptors 220a, 220b (refer to FIG. 2), which is felt by the pilot, thereby providing a tactile warning to the pilot of an imminent occurrence of a tailstrike.

Figure 5:
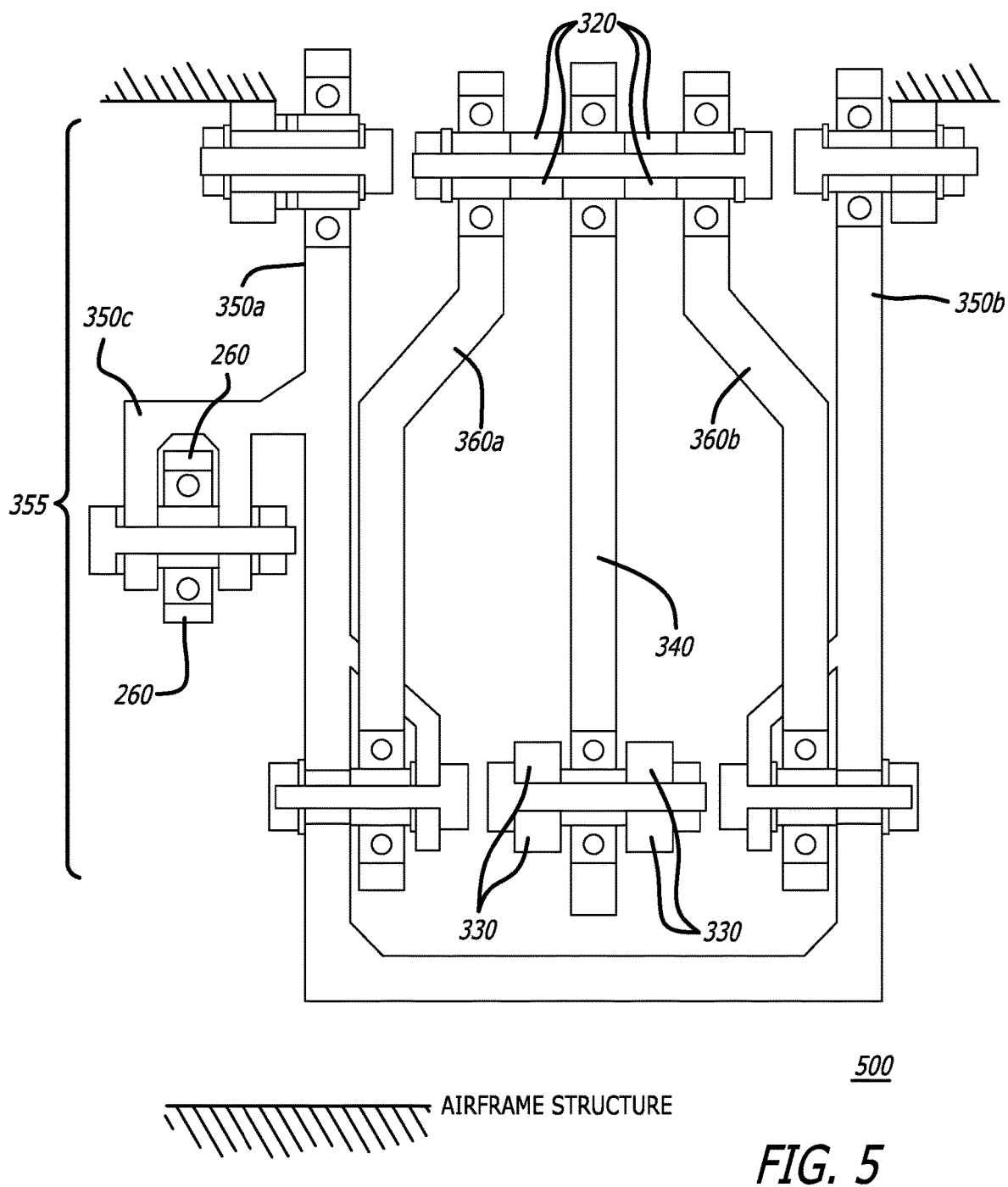
FIG. 5 is a diagram showing the front view of the linkage mechanism of the TSAS mechanism of FIG. 4, in accordance with at least one embodiment of the present disclosure.

FIG. 5 is a diagram showing the front view 500 of the linkage mechanism 355 of the TSAS mechanism 400 of FIG. 4, in accordance with at least one embodiment of the present disclosure. In this figure, the outer bars 350a, 350b; the outer bar clevis 350c; the inner bars 360a, 360b; and the middle bar 340 are shown. An end of the middle bar 340 is shown to be connected to an end of the leaf spring 330. And, the opposite end of the middle bar 340, as well as an end of the inner bar 360a and an end of the inner bar 360b, are shown to be connected to an end of the push rod 320. The opposite end of the inner bar 360a is shown to be connected to an end of the outer bar 350a, and the opposite end of the inner bar 360b is shown to be connected to an end of outer bar 350b. Also, the outer bar clevis 350c is shown to be connected to outer bar 350a. Additionally, an end of the ball nut 260 of the actuator 250 is shown to be connected to the outer bar clevis 350c of the linkage mechanism 355.

FIGS. 6A, 6B, and 6C are diagrams, viewed from the right side of the aircraft 210, showing the side view 600, 610, 620 of the TSAS mechanism 400 of FIG. 4 that together illustrate the movement of the TSAS mechanism 400 that occurs during operation of the disclosed system for reducing the probability of the occurrence of an aircraft's tailstrike, in accordance with at least one embodiment of the present disclosure. FIG. 6A shows the position of the TSAS mechanism 400 during normal flight control mode (i.e. when the processor(s) determines that the aircraft pitch attitude is not greater than threshold 1, thereby indicating a normal flight control mode where a tailstrike occurrence is not imminent). In this figure, the ball nut 260 of the actuator 250 is extended (i.e. the actuator 250 has not stroked in FIG. 6A), and the leaf spring 330 is unloaded.

FIG. 6B shows the position of the TSAS mechanism 400 during the beginning of the activation of a tactile warning (i.e. when the processor(s) determines that the aircraft pitch attitude is greater than threshold 1, thereby indicating that a tailstrike occurrence is imminent). In this figure, the ball nut 260 of the actuator 250 is retracted in the direction of arrow A, which rotates the outer bar 350a (as well as outer bar 350b, the outer bar clevis 350c, and the inner bars 360a, 360b which are not shown in FIG. 6B) in the same direction.

FIG. 6C shows the position of the TSAS mechanism 400 during the latter part of the activation of a tactile warning (i.e. when the processor(s) determines that the aircraft pitch attitude is greater than threshold 1, thereby indicating that a tailstrike occurrence is imminent). In this figure, the new position of the outer bar 350a (as well as outer bar 350b and the outer bar clevis 350c, which are not shown in FIG. 6C) changes the mechanical advantage between the pitch inceptor 310 and the end of the leaf spring 330. When the pitch inceptor 220a is pulling aftward, the pitch inceptor 310 rotates in the direction of arrow B (also refer to aft rotation direction arrow B shown in FIG. 7) for the aircraft nose rising up, the crossbar 390; the inner bars 360a, 360b; the middle bar 340; the push rod 320; and the pitch inceptor 310 are displaced accordingly, while the leaf spring 330 is wanting to return back to its flat position (as shown in FIGS. 6A and 6B) in the direction of arrow C. Therefore, an additional force is required at the pitch control inceptors 220a, 220b (refer to FIG. 2). This additional force is felt by the pilot, thereby providing a tactile warning to the pilot.

FIG. 7 is a diagram 700, viewed from the left side of the aircraft 210, showing the pilot 720 pulling aft on a typical pitch control inceptor 220a in the cockpit 215 of the aircraft 210, in accordance with at least one embodiment of the present disclosure. This figure shows the pilot 720 pulling aft on the pitch control inceptor 220a in the direction of arrow A during a landing or takeoff of the aircraft 210 during a normal flight control mode (i.e. when the processor(s) determines that the aircraft pitch attitude is not greater than threshold 1, thereby indicating a normal flight control mode where a tailstrike occurrence is not imminent).

FIG. 7 also shows the pitch control inceptor rotation angle (θ) of FIG. 8, in accordance with at least one embodiment of the present disclosure. In this figure, it is shown that when the pitch control inceptor rotation angle (θ) is equal to zero (0) degrees, the pitch control inceptor 220a is positioned in its neutral position (i.e. the pitch control inceptor 220a is neither pulled aft nor pushed forward). As the pitch control inceptor is being pulled aft by the pilot 720, the pitch control inceptor rotation angle (θ) increases accordingly in size.

FIG. 8 is a graph 800 depicting the pitch control inceptor rotation angle (θ) versus the pilot input force being applied by the TSAS mechanism 400 versus the amount of actuator stroke by the actuator 250 of the disclosed system for reducing the probability of the occurrence of an aircraft's tailstrike, in accordance with at least one embodiment of the present disclosure. In particular, on the graph 800, the x-axis denotes the pitch control inceptor 220a, 220b rotation angle (θ) in degrees. The rotation angle (θ) is depicted in FIG. 7. And, the y-axis denotes the amount of pilot input force (i.e. the force in the direction of arrow A of FIG. 7) in pounds of force (lbf) on the pitch control inceptor 220a, 220b due to the TSAS mechanism 400. The graph 800 shows three lines, which each indicate a different amount of actuator stroke (refer to FIG. 3C) in inches. (It should be noted that other amounts of actuator stroke are possible, but are not shown on the graph.) The lines on the graph show that as the actuator stroke and the pitch control inceptor rotation angle increases, the pilot 720 will feel an increase in the amount of force ((i.e. the force in the direction of arrow A of FIG. 7) on the pitch control inceptor 220a, 220b. The lines on the graph show that: (a) the magnitude of the pilot input force is a function of the actuator stroke, (b) the pilot input force is smoothly increased to the pitch control inceptor, (c) the pilot input force is smoothly ramped out when a tailstrike is no longer imminent, and (d) there are at least two distinct force gradients for each actuator stroke.

FIGS. 9A, 9B, 9C, and 9D together show an additional embodiment for the disclosed system for reducing the probability of the occurrence of an aircraft's tailstrike where a safety mechanism is implemented into the TSAS mechanism (e.g., refer to 400 of FIG. 4) to safeguard against the occurrence of foreign object debris (FOD) causing a jam in the linkage mechanism 355 that leads to impeding pilot movement of the pitch control inceptor 220a during normal flight control mode, in accordance with at least one embodiment of the present disclosure. In particular, these embodiments illustrate a modification to the design of the TSAS mechanism (refer to 400 of FIG. 4) by employing an additional link 391 and fuse 392 to the design. In addition, for these embodiments, the crossbar 390 is modified to integrate a flange 394.

FIG. 9A is a diagram showing a side view of a portion of the TSAS mechanism that employs the additional link 391 and the fuse 392, in accordance with at least one embodiment of the present disclosure. And, FIG. 9B is a diagram showing a cut-away front view of a portion of the TSAS mechanism that employs the additional link 391 and the fuse 392, in accordance with at least one embodiment of the present disclosure.

It should be noted that during operation of the disclosed system in normal flight control mode, FOD may enter the linkage mechanism 355 of the TSAS mechanism (e.g., refer to 400 of FIG. 4) and cause the linkage mechanism 355 to jam. This will impede pilot movement of the pitch control inceptor 220a. FOD refers to any article or substance, alien to an aircraft or system, that can potentially cause damage. The embodiment depicted in FIGS. 9A, 9B, 9C, and 9D mitigates the FOD effect.

As shown in FIGS. 9A and 9B, the crossbar 390, which includes a flange 394, (or input member) is connected to the pitch inceptor 310 (or output member) via a link 391, thereby providing torque continuity. The upper end of the pitch inceptor 310 is concentrically mounted to the crossbar 390 on a bearing 393, or the like. One end of the link 391 is attached to the pitch inceptor 310 at point B. The other end of the link 391 is attached to the crossbar 390 by a fuse 392, which could be an aluminum rivet, at point C. The angle θ of the link 391 (refer to line CB) relative to a radius of the crossbar 390 and flange 394 (refer line AC) is optimized to obtain the desired shearout torque. Point A represents a hinge for rotation between the crossbar 390 and the pitch inceptor 310, and Point B represents a hinge for rotation between the link 391 and the pitch inceptor 310 during the shearing (i.e. breaking off) of fuse 392.

During operation in normal flight control mode, when the push rod 320 (or some any component of linkage mechanism 355) is jammed, pilot effort to the crossbar 390 (via the pitch control inceptor 220a) will shear out the fuse 392. After the fuse 392 is sheared, the link 391 is only connected at point B. Subsequently, the crossbar 390 is able to rotate relative to the stationary (i.e. jammed) pitch inceptor 310. The crossbar 390/pitch inceptor 310 (input/output members) will not seize, nor will they separate and create a secondary system jam.

FIGS. 9C and 9D are diagrams showing a side view of a portion of the TSAS mechanism that employs an additional link 391 with the fuse 392 sheared, in accordance with at least one embodiment of the present disclosure. These diagrams illustrate the ability of the crossbar 390 to rotate freely in the direction of the arrows after the fuse 392 has been sheared, which causes the link 391 to drop down due to gravity.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

Where methods described above indicate certain events occurring in certain order, those of ordinary skill in the art having the benefit of this disclosure would recognize that the ordering may be modified and that such modifications are in accordance with the variations of the present disclosure. Additionally, parts of methods may be performed concurrently in a parallel process when possible, as well as performed sequentially. In addition, more parts or less part of the methods may be performed.

Accordingly, embodiments are intended to exemplify alternatives, modifications, and equivalents that may fall within the scope of the claims.

Although certain illustrative embodiments and methods have been disclosed herein, it can be apparent from the foregoing disclosure to those skilled in the art that variations and modifications of such embodiments and methods can be made without departing from the true spirit and scope of the art disclosed. Many other examples of the art disclosed exist, each differing from others in matters of detail only. Accordingly, it is intended that the art disclosed shall be limited only to the extent required by the appended claims and the rules and principles of applicable law.

I claim:

1. A method for reducing a probability of an occurrence of a tailstrike for an aircraft, the method comprising:
    determining, by at least one processor of the aircraft, whether a tailstrike has a first probability of occurring by using tailstrike related data; and
    producing, by an actuator of the aircraft, a tactile warning to a pilot of the aircraft, when the at least one processor determines that the tailstrike has the first probability of occurring,
    wherein the tactile warning is at least one of a force or a vibration applied to a pitch control inceptor in a cockpit of the aircraft.

2. The method of claim 1, wherein the determining of whether the tailstrike has the first probability of occurring comprises:
    determining, by the at least one processor, whether an aircraft pitch attitude is greater than a first probability threshold by using the tailstrike related data; and
    determining, by the at least one processor, that the tailstrike has the first probability of occurring, when the aircraft pitch attitude is greater than the first probability threshold.

3. The method of claim 1, wherein the method further comprises:
    determining, by the at least one processor, whether a tailstrike has a second probability of occurring by using the tailstrike related data; and
    at least one of displaying, on a display, a visual warning, or sounding, by a speaker, an audible warning, when the at least one processor determines that the tailstrike has the second probability of occurring.

4. The method of claim 3, wherein the determining of whether the tailstrike has the second probability of occurring comprises:
    determining, by the at least one processor, whether an aircraft pitch attitude is greater than a second probability threshold by using the tailstrike related data; and
    determining, by the at least one processor, that the tailstrike has the second probability of occurring, when the aircraft pitch attitude is greater than the second probability threshold.

5. The method of claim 1, wherein the tailstrike related data comprises at least one of aircraft systems set for takeoff or landing configuration, speedbrake system status, engine thrust control status, high lift system status, landing gear status, aircraft altitude, pilot pitch input force, airport data of aircraft dynamics, aircraft pitch attitude, aircraft sink rate, or aircraft angle of attack.

6. The method of claim 1, wherein the actuator is connected to the pitch control inceptor via a linkage mechanism.

7. The method of claim 6, wherein the linkage mechanism is connected to one of a leaf spring, a helical spring, or an elastic object.

8. The method of claim 7, wherein the producing of the tactile warning comprises moving the linkage mechanism, by changing a stroke of the actuator and deforming the leaf spring, to provide a force on the pitch control inceptor, which is felt by the pilot of the aircraft.

9. The method of claim 6, wherein during normal flight control mode, when foreign object debris (FOD) jams the linkage mechanism, disengaging the linkage mechanism from the pitch control inceptor, thereby allowing for unimpeded movement of the pitch control inceptor.

10. The method of claim 1, wherein the aircraft comprises a fly-by-wire flight control system.

11. The method of claim 1, wherein characteristics of the tactile warning are at least one of a magnitude of a pilot input force that is a function of actuator stroke, the pilot input force that is increased when the tailstrike has the first probability of occurring, the pilot input force that is ramped out when the tailstrike no longer has the first probability of occurring, or at least two distinct force gradients for the actuator stroke.

12. The method of claim 1, wherein the method further comprises:
    determining, by the at least one processor, whether the actuator can be fully extended; and
    activating a warning light associated with a health status of the actuator, by the at least one processor, when the at least one processor determines that the actuator is not capable of fully extending,
    wherein activation of the warning light associated with the health status of the actuator notifies the pilot that since the actuator cannot be fully extended, the pilot will need to use extra force on a pitch control inceptor in a cockpit of the aircraft during normal flight control mode.

13. A system for reducing a probability of an occurrence of a tailstrike for an aircraft, the system comprising:
    at least one processor, of the aircraft, configured to determine whether a tailstrike has a first probability of occurring by using tailstrike related data; and
    an actuator, of the aircraft, configured to produce a tactile warning to a pilot of the aircraft, if the at least one processor determines that the tailstrike has the first probability of occurring,
    wherein the tactile warning is at least one of a force or a vibration applied to a pitch control inceptor in a cockpit of the aircraft.

14. The system of claim 13, wherein to determine whether the tailstrike has the first probability of occurring, the at least one processor is further configured to determine whether an aircraft pitch attitude is greater than a first probability threshold by using the tailstrike related data; and configured to determine that the tailstrike has the first probability of occurring, if the aircraft pitch attitude is greater than the first probability threshold.

15. The system of claim 13, wherein the at least one processor is further configured to determine whether a tailstrike has a second probability of occurring by using the tailstrike related data; and
    wherein the system further comprises at least one of a display configured to display a visual warning or a speaker to sound an audible warning, if the at least one processor determines that the tailstrike has the second probability of occurring.

16. The system of claim 15, wherein to determine whether the tailstrike has the second probability of occurring, the at least one processor is further configured to determine whether an aircraft pitch attitude is greater than a second probability threshold by using the tailstrike related data; and configured to determine that the tailstrike has the second probability of occurring, if the aircraft pitch attitude is greater than the second probability threshold.

17. The system of claim 13, wherein the actuator is connected to the pitch control inceptor via a linkage mechanism.

18. The system of claim 17, wherein the linkage mechanism is connected to one of a leaf spring, helical spring, or an elastic object.

19. The system of claim 13, wherein the aircraft comprises a fly-by-wire flight control system.

20. The system of claim 13, wherein the tailstrike related data comprises at least one of aircraft systems set for takeoff or landing configuration, speedbrake system status, engine thrust control status, high lift system status, landing gear status, aircraft altitude, pilot pitch input force, airport data of aircraft dynamics, aircraft pitch attitude, aircraft sink rate, or aircraft angle of attack.

\* \* \* \* \*